United States Patent [19]

Wulff et al.

[11] Patent Number: 5,684,087
[45] Date of Patent: Nov. 4, 1997

[54] PROCESS FOR PRODUCING THERMOPLASTIC GRANULATED POLYMER MATERIAL FROM POLYMER SOLUTIONS

[75] Inventors: Claus Wulff, Krefeld; Gottfried Zaby, Leverkusen; Clemens Casper, Krefeld; Klemens Kohlgrüber, Kürten; Thomas Bamberger, Duisburg; Hugo Obermann, Dormagen, all of Germany

[73] Assignee: Bayer Aktiengesellschaft, Germany

[21] Appl. No.: 719,775

[22] Filed: Sep. 25, 1996

[30] Foreign Application Priority Data

Oct. 5, 1995 [DE] Germany ............... 195 37 113.5

[51] Int. Cl.⁶ .................................................. C08G 63/48
[52] U.S. Cl. .................. 525/63; 521/146; 525/64; 525/69; 525/70; 528/176; 528/196
[58] Field of Search .................................. 528/176, 196; 525/63, 64, 69, 70; 521/146

[56] References Cited

U.S. PATENT DOCUMENTS

| | | | |
|---|---|---|---|
| 2,992,679 | 7/1961 | Twaddle | 159/47.1 |
| 3,508,339 | 4/1970 | Neblett | 34/368 |
| 4,198,265 | 4/1980 | Johnson | 159/47 R |
| 4,808,262 | 2/1989 | Aneja et al. | 159/47.1 |
| 5,407,266 | 4/1995 | Dotsch et al. | 366/298 |

FOREIGN PATENT DOCUMENTS

| | | |
|---|---|---|
| 0 027 700 | 4/1981 | European Pat. Off. |
| 0 102 122 | 3/1984 | European Pat. Off. |
| 0 267 531 | 5/1988 | European Pat. Off. |
| 0 460 466 | 12/1991 | European Pat. Off. |
| 0 528 210 | 2/1993 | European Pat. Off. |
| 1 404 237 | 4/1969 | Germany. |
| 1404984 | 4/1969 | Germany. |
| 4 022 232 | 1/1992 | Germany. |
| 4 134 483 | 4/1993 | Germany. |
| 1 347 294 | 2/1974 | United Kingdom. |

*Primary Examiner*—Terressa Mosley
*Attorney, Agent, or Firm*—Connolly & Hutz

[57] ABSTRACT

This invention relates to a process for producing granulated polymer materials from polymer solutions, in which organic solvent of the polymer solution is evaporated in a heat exchanger, optionally with the admixture of steam, or in a holding tube with the admixture of steam, and the paste-like mixture of concentrated solution, solvent vapour and optionally of condensed steam is separated in a separator provided with rotating built-in components for cleaning off the walls. The pre-concentrated polymer solution is further concentrated in the separator by supplying heat by way of heating the separator walls or the rotating built-in components and by the shearing energy of the rotating built-in components.

Residual degassing of the solvent is effected before granulation, e.g. in the discharge extruder of the separator which is provided with rotating built-in components, through one or more degassing zones, optionally by the additional admixture of entraining media, such as inert gas or steam, for example.

15 Claims, 8 Drawing Sheets

PROCESS FOR PRODUCING THERMOPLASTIC GRANULATED POLYMER MATERIAL FROM POLYMER SOLUTIONS

This invention relates to a process for producing thermoplastic granulated polymer material from polymer solutions, in which organic solvent of the polymer solution is evaporated in a heat exchanger, optionally with the admixture of steam, or in a holding tube with the admixture of steam, and the paste-like mixture of concentrated solution, solvent vapour and optionally of condensed steam is separated in a separator provided with rotating built-in components for cleaning off the walls. The pre-concentrated polymer solution is further concentrated in the separator by supplying heat by way of heating the separator walls or the rotating built-in components, and by the shearing energy of the rotating built-in components.

Residual degassing of the solvent is effected before granulation, e.g. in the discharge extruder of the separator which is provided with rotating built-in components, through one or more degassing zones, optionally by the additional admixture of entrainment media, such as inert gases or steam, for example. When a melt pump is used as a discharge device instead of an extruder, degassing can be effected in the known manner via other suitable devices, such as a long-tube evaporator for example.

According to the previously known processes, e.g. the process described in U.S. Pat. No. 3,508,339, the isolation of polycarbonate from polycarbonate solutions, for example, is effected by way of a solid phase in the form of a powder or of agglomerates, which sometimes has a very low bulk density. Powders of higher bulk density are obtained when isolation is effected by crystallisation by known processes.

Crystalline or partially crystalline polycarbonate particles are obtained, for example, by the processes described in German Offenlegungsschrift DE 4 022 232 or in German Offenlegungsschrift DE 4 134 483 by evaporating the solvent in an apparatus for intimate mixing with continuous or batch-wise discharge, by adding the polycarbonate solution to partially crystalline polycarbonate which is previously placed in a vessel and evaporating the solvent. The apparatuses described in these documents are not suitable for melting the recovered polycarbonate and degassing it in the melt, however.

The powders or agglomerates obtained from the aforementioned processes are dried as solids, subsequently melted in an extruder, compacted through dies to form strands and the strands are granulated. These processes are economically disadvantageous due to the multi-stage nature of the process. Moreover the polymers produced still contain unwanted solvent residues and have poor colour properties.

According to other isolation processes, the concentrated solutions obtained by multi-stage evaporation, of polycarbonate for example, are further concentrated in extruders fitted with degassing heads, in combination with degassing the melt, optionally with the addition of a high boiling solvent also. A process such as this is described in German Auslegungsschrift DE 1 209 741.

However, these processes have the disadvantage that the added high boiling solvents in the degassing zone of the extruder can only be removed at very high temperature or at a very low partial pressure. Low partial pressures are obtained by evacuation, or, as preferred industrially, by admixing inert gas or steam into the polymer melt. Despite the high processing cost, unwanted traces of high boiling solvents nevertheless remain in the polymers.

If low boiling solvents, such as the solvent dichloromethane which is preferably used in the production of polycarbonate by the phase boundary process, are used instead of high boiling solvents, degassing is facilitated due to the low boiling point of this type of solvent. However, this process has the disadvantage that, on account of the gel formation and crystallisation of the highly concentrated polymer solution, e.g. of a polycarbonate solution, which then occurs, pre-concentration under normal pressure can only be effected up to a polycarbonate concentration of about 30% by weight. Solutions such as these are then pumped into extruders which are provided with degassing connection pieces. In this respect, a pressure maintenance device is built into the extruder to prevent the premature evaporation of the solvent upstream of the first degassing connection piece. In addition, a pressure gradient is applied in order to prevent sudden evaporation of the solvent, which results in a high impact pressure in the vapour space. If a high impact pressure occurs, droplets of the polymer solutions and solid polymer particles which have already been evaporated are swept away with the vapours. The increased pressure which is employed to prevent a high impact pressure necessitates a higher processing temperature, which in turn results in increased decomposition of the solvent, e.g. hydrogen chloride is split off from the solvent dichloromethane. The consequence of the decomposition of the solvent is a reduced quality of the polymers.

The object of the present invention is to find a more efficient process for producing granulated polymer materials from a polymer solution, which does not have the disadvantages of the prior art and which in particular makes it possible to produce granulated polymer material continuously, at a high mass throughput and with high quality.

It has been found that, with the aid of modified mixing apparatuses of large volume, e.g. single- or twin-shaft kneading machines corresponding to patent specifications EP 460 466 or EP 528 210, which have hitherto only been used for the drying of solids or for similar processes, pre-concentrated polymer solutions can successfully be processed to form polymer melts of high viscosity at an economic throughput if the rotors, the drive part, and particularly the bars mounted on the rotors, are strengthened. Moreover, in some circumstances the speed ratio, which for twin-shaft mixers with counter-rotation is 1:4 for example, has to be altered for economic use, e.g. preferably to 1:1, due to the total energy input then being higher.

When using a high boiling point solvent for the polymer, the high viscosity of the mixture is not reached, due to the higher glass transition temperature in this case. It has also been found that the use of an apparatus of large volume for separating the heated polymer solutions and for further concentration as far as the melt results in polymers with a lower residual solvent content. This is achieved due to the longer mean dwell time of the mixture compared with screw machines.

It has also been found that the properties of the granulated polymer materials produced according to the invention, e.g. the colour index, as characterised by the yellowness index, is superior to that of granulated materials obtained by the known processes, despite the longer mean dwell time in the apparatuses used according to the invention, and that the thermal cleavage of the polymers during the isolation procedure according to the invention, as quantified by the difference between the relative solution viscosities of the polymers, is less.

The apparatuses mentioned above, without the adaptations for their use according to the invention, are described in U.S. Pat. No. 5,407,266 (Apr. 18, 1995) and EP 0 460 466 A1, and in EP 0 528 210 A1.

The present invention relates to a process for producing granulated polymer material from polymer solutions of thermoplastic polymers by pre-concentration of the polymer solution by means of heat exchange or stripping the solvent with steam in a holding tube or a heat exchanger to form concentrated polymer solution or polymer paste, further concentration and drying in a drying apparatus, extrusion and granulation of the dried polymer, characterised in that the polymer solution, particularly an ABS or polycarbonate solution, preferably a solution of polycarbonate having a molecular weight characterised by a solution viscosity $\eta_{rel.}$ of 1.15 to 1.40, preferably of 1.20 to 1.35, with a polymer concentration of 3 to 30% by weight, preferably of 15 to 25% by weight, in an organic solvent, preferably in dichloromethane, is heated in one or more heat exchangers, the total heat exchange surface of which is 0.02 $m^2$/100 kg/hr solvent to 2 $m^2$/100 kg/hr solvent, under a pressure of 1 to 15 bar, preferably of 1 to 5 bar, measured at the outlet of the heat exchanger, and at a temperature in the heat exchanger of 50° C. to 300° C., preferably of 150° C. to 250° C., or is heated by mixing with superheated steam at a temperature of 100° to 300° C., preferably of 140° to 250° C., at a solvent/steam ratio of $\geq 10:1$, in a heated or unheated holding tube having a length/diameter ratio of 100 to 10,000, preferably of 1000 to 2000, or is heated by mixing with steam at a temperature of 100° to 300° C., preferably of 140° C. to 250° C., and at a pressure of 1 to 100 bar, preferably of 16 to 30 bar, in a heat exchanger, the heat exchange surface of which is 0.02 $m^2$/100 kg/hr solvent to 2 $m^2$/100 kg/hr solvent, and the mixture heated in this manner is separated by flashing into a separator with separation of the vapours to form concentrated polymer solution or paste with a concentration of 25 to 80% by weight, preferably of 35 to 60% by weight, of the concentrated paste or solution with respect to the polymer, and optionally to form concentrated steam, that the concentrated polymer solution or paste, optionally also after intermediate separation in a separator which is not provided with rotating built-in components and subsequent reheating in a drying apparatus which is provided with rotating built-in components for cleaning off the walls and for mass transfer, is heated to form the melt and is further concentrated or degassed by heating the housing jacket or by heating the rotating built-in components or by heating the housing jacket and the rotating built-in components, and by the shearing caused by the built-in components moving in the separated material, wherein the temperature of the apparatus wall and of the built-in components is from 150° to 400° C., preferably from 200° to 300° C., and most preferably from 240° to 280° C., and that the dried polymer is subsequently extruded and granulated. In particular, the vapours arising are led away via openings situated in the upper part of the apparatus.

The concentration and degassing process is conducted at an internal pressure of 1 mbar to 5 bar, preferably at normal pressure, optionally with the addition of inert gas or steam also. The dwell time is 5–90 minutes, preferably 5–20 minutes. The built-in components must be of sufficient mechanical stability to overcome the high shearing forces of the mixtures of plasticised and solidified polycarbonate melts which occur during the transition of the solid, which is formed during flashing, from its solid state to the melt. The drive power of the rotating built-in components and their mechanical strength must be matched to the shearing forces occurring during the process.

The total energy input in the process according to the invention, expressed as the specific kneading energy with respect to the discharge throughput, is from 0.01 to 1 kWh per kg of dry polymer melt, preferably from 0.05 to 0.5 kWh/kg, and most preferably from 0.1 to 0.3 kWh/kg dry polymer melt.

The polymer melt is preferably discharged from the drying apparatus by means of an extruder or melt pump.

If discharge is effected by means of an extruder, residual degassing of the polymer is preferably effected by the provision of entraining gas zones and degassing zones on the discharge extruder, and if the melt is discharged by means of a melt pump it is preferably effected by the insertion of a degassing device, e.g. a long-tube evaporator, or by the downstream connection of an extruder having degassing devices. The process of concentration or that of degassing by means of a discharge extruder may be combined with that of the admixture of other materials into the polymer, such as other polymers, colorants, stabilisers, fillers or glass fibres for example.

The process may also be operated as a multi-stage process. In this situation, the concentrated polymer mixture is flashed from the heat exchanger into a separator which preferably contains no rotating built-in components, and the gas phase is separated from the liquid phase. This separator can be operated at reduced pressure, at atmospheric pressure, or preferably under elevated pressure. The polymer-containing mixture which is separated in this separator is discharged by means of a melt pump, heated under pressure in a further heat exchanger, and is flashed into a drying apparatus as described previously, which is provided with rotating built-in components. Further concentration is effected in this apparatus as for the single-stage separation.

Residual degassing of the solvent is effected in the discharge extruder of the separator provided with rotating built-in components, by means of one or more degassing zones, optionally by the additional admixture of entraining media, such as inert gas or steam for example, in the known manner. When using a melt pump as the discharge unit instead of an extruder, degassing may be effected in the known manner via other suitable devices, e.g. a long-tube evaporator.

The granulated polymer materials obtained by this process are distinguished by their extremely low contents of residual solvent, by their good colour properties and by the low extent of thermal decomposition of the polymer chain in the isolation process.

Solvents for the thermoplastic: polymers in the sense of the invention are organic solvents which dissolve at least 5% by weight of the polymer, particularly methylene chloride, chlorobenzene, toluene, tetrahydrofuran or 1,3-dioxolane, as well as mixture of the said solvents; dichloromethane is particularly preferred.

The strands obtained by pressing the melt through dies are cooled and granulated. The granulated materials are processed to form mouldings by an injection moulding process. These polycarbonate bodies are used in the usual manner, for example in the field of electrical engineering, in optics, in the construction of vehicles and in the lighting industry.

Examples of suitable thermoplastic polymers which are processed to form granulated materials by the process according to the invention include polycarbonate, polyester carbonate, polyalkylene terephthalate, EPDM polymers (ethylene propylene diene terpolymer rubbers), polystyrene, as well as polystyrene copolymers and graft copolymers, e.g. of polystyrene with acrylonitrile or with acrylonitrile and butadiene, such as ABS in particular. The preferred polymers are acrylonitrile-butadiene-styrene copolymers (ABS) and aromatic polycarbonate.

The thermoplastic aromatic polycarbonates which are most preferably used in the sense of the process according to the invention are aromatic homo-polycarbonates, copolycarbonates and mixtures of these polycarbonates, which are derived in particular from the following diphenols:

hydroquinone, resorcinol, dihydroxydiphenyl, bis-(hydroxyphenyl)-alkanes, bis-(hydroxyphenyl)-cycloalkanes, bis-(hydroxyphenyl) sulphides, -ethers, -sulphoxides, -sulphones and α,α'-bis-(hydroxyphenyl)-diisopropylbenzenes, and also compounds thereof which have alkylated or halogenated nuclei.

Examples of suitable diphenols are described in the following U.S. Patents: U.S. Pat. No. 3,28,365, U.S. Pat. No. 2,999,835, U.S. Pat. No. 3,062,781, U.S. Pat. No. 3,148,172 and U.S. Pat. No. 4,982,014, in German Offenlegungsschriften DE 1 570 703 and DE 2 063 050, and in the monograph by H. Schnell, "Chemistry and Physics of Polycarbonates", Interscience Publishers, New York, 1964.

Preferred diphenols include
4,4'-dihydroxydiphenyl,
2,2-bis-(4-dihydroxyphenyl)-propane,
2,4-bis-(4-dihydroxyphenyl)-2-methylbutane,
1,1-bis-(4-dihydroxyphenyl)-cyclohexane,
α,α'-bis-(4-dihydroxyphenyl)-p-diisopropylbenzene,
α,α'-bis-(4-dihydroxyphenyl )-m-diisopropylbenzene,
2,2-bis-(3-methyl-4-hydroxyphenyl)-propane,
2,2-bis-(3-chloro-4-hydroxyphenyl)-propane,
bis-(3,5-dimethyl-4-hydroxyphenyl-methane,
2,2-bis-(3,5-dimethyl-4-hydroxyphenyl)-propane,
bis-(3,5-dimethyl-4-hydroxyphenyl)-sulphone,
2,4-bis-(3,5-dimethyl-4-hydroxyphenyl)-2-methylbutane,
1,1-bis-(3,5-dimethyl-4-hydroxyphenyl)-2-cyclohexane,
α,α'-bis-(3,5-dimethyl-4-dihydroxyphenyl)-p-diisopropylbenzene,
1,1-bis-(4-hydroxyphenyl)-3,3,5-trimethylcyclohexane,
1,1-bis-(4-hydroxyphenyl)-3-methylcyclohexane,
1,1-bis-(4-dihydroxyphenyl )-3,3-dimethylcyclohexane,
1,1-bis-(4-dihydroxyphenyl)-4-methylcyclohexane,
2,2-bis-(3,5-dichloro-4-hydroxyphenyl)-propane,
2,2-bis-(3,5-dibromo-4-hydroxyphenyl)-propane,
1,1-bis-(4-hydroxyphenyl)-1- phenyl-ethane,
2,2-bis-(3,5-dimethyl-4-hydroxyphenyl)-2-phenyl-ethane,
2,2-bis-(4-hydroxyphenyl)-2,2-diphenyl-ethane,
9,9-bis-(4-hydroxyphenyl)-fluorene,
9,9-bis-(3,5-dimethyl-4-hydroxyphenyl)-fluorene.

Examples of particularly preferred diphenols include:
2,2-bis-(4-dihydroxyphenyl)-propane,
2,2-bis-(3,5-dimethyl-4-hydroxyphenyl)-propane,
1,1-bis-(4-dihydroxyphenyl)-cyclohexane,
1,1-bis-(4-hydroxyphenyl)-1-phenyl-ethane,
1,1-bis-(4-hydroxyphenyl)-3,3,5-trimethylcyclohexane,
1,1-bis-(4-hydroxyphenyl)-3-methylcyclohexane,
1,1-bis-(4-dihydroxyphenyl)-4-methylcyclohexane,
9,9-bis-(4-hydroxyphenyl)-fluorene.

2,2-bis-(4-dihydroxyphenyl)-propane, 1,1-bis-(4-hydroxyphenyl)-3,3,5-trimethylcyclohexane and 1,1-bis-(4-hydroxyphenyl)-1-phenyl-ethane are particularly preferred.

Any mixtures of the aforementioned diphenols may also be used.

For the purpose of improving the flow behaviour, small amounts, preferably amounts between 0.05 and 2.0 mole % (with respect to the moles of diphenols used), of trifunctional compounds or compounds with a functionality greater than three, particularly those containing three or more than three phenolic hydroxyl groups, can be used in conjunction in the known manner during the synthesis of the said polycarbonates. Examples of some of the compounds which can be used include:
1,3,5-tris-(4-hydroxyphenyl)-benzene,
1,3,5-tris-(4-(4-hydroxyphenylisopropyl)-phenyl)-benzene,
1,1,1-tris-(4-hydroxyphenyl)-ethane,
2,6-bis-(2-hydroxy-5'-methyl-benzyl)-4-methylbenzene,
2-(4-hydroxyphenyl)-2-(2,4-dihydroxyphenyl)-propane,
hexakis-(4-(4-hydroxyphenylisopropyl)-phenyl) orthoterephthalic acid ester,
tetrakis-(4-hydroxyphenyl)-methane,
1,4-bis-((4',4"-dihydroxytriphenyl)-methyl)benzene,
3,3-bis-(4-hydroxyphenyl)-2-oxo-2,3-dihydroindole,
3,3-bis-(4-hydroxy-3-methyl-phenyl)-2-oxo-2,3-dihydroindole.

The chlorocarboxylic acid esters corresponding to these compounds are also suitable, as are the acids or preferably the acid chlorides of aliphatic or aromatic carboxylic acids with a basicity greater than two, i.e. for example:

2,4-dihydroxybenzoic acid, or 2,4-dihydroxybenzoic acid dichloride, trimesic acid, or trimesic acid trichloride, trimellitic acid, or trimellitic acid trichloride, cyanuric acid trichloride, wherein these branching agents may be placed in the vessel initially, individually or in admixture, or may be added in portions to the synthesis.

Substances which can be used as chain terminators during the polycarbonate synthesis include phenols, optionally substituted phenols, and the chlorocarboxylic acid esters thereof, monocarboxylic acids and acid chlorides thereof, preferably cumyl phenol, phenol, p-tert.-butylphenol and i-octylphenol, optionally as mixtures; these may contain the usual impurities and isomers. The chain terminators may be placed in the vessel initially, individually or in admixture with the diphenols, or may be added in portions to the synthesis.

The preferred polycarbonate or polycarbonate mixtures which are accessible to the isolation process according to the invention can be produced, for example, by the following known methods (see H. Schnell, "Chemistry and Physics of Polycarbonates", Polymer Review, Volume IX, page 27 et seq., Interscience Publishers, New York, 1964):

1. by the melt transesterification process:
   in the melt transesterification process, the molecular weight is condensed on with the addition of diphenyl carbonate in stoichiometric amounts or in an excess of up to 40% by weight, with the continuous removal by distillation of phenol and optionally of the excess diphenyl carbonate. This process is conducted with the use of customary catalysts such as alkali metal ions, e.g. Li, Na, K, or transition metal compounds, e.g. those based on Sn, Zn or Ti, as a single-stage or two-stage process, i.e with the possible separate condensing-on of the oligomer and of the polymer.

2. by the solution process in disperse phase, the so-called "two-phase boundary process":
   The diphenols to be used here are dissolved in an aqueous alkaline phase. In addition, the chain terminators which are necessary for the production of the polycarbonates according to the invention are optionally dissolved in amounts of 1.0 to 20.0 moles %, with respect to moles of diphenol, in an aqueous alkaline phase, preferably sodium hydroxide solution, or are added in bulk to the latter and an inert organic phase. The mixture is then reacted with phosgene in the presence of an inert organic phase which preferably dissolves polycarbonate. The reaction temperature is between 0° C. and 50° C.

The requisite chain terminators and branching agents may also be added during the phosgenation or as long as chlorocarboxylic acid esters are present in the synthesis mixture, and may be added in bulk, as a melt, or as a solution in alkali or in inert organic solvents.

The reaction can be speeded up by catalysts such as tertiary amines or onium salts. Tributylamine, triethylamine and N-ethylpiperidine are preferred.

In addition to or instead of the diphenols, chlorocarboxylic acid esters or bischlorocarboxylic acid esters thereof may be used, or both may be used or may be added during the synthesis.

Suitable solvents comprise all those solvents which dissolve polycarbonates to a sufficient extent and which have a boiling point no higher than 150° C. Preferred solvents include dichloromethane, monochlorobenzene, toluene, tetrahydrofuran or 1,3-dioxolane and mixtures of the said solvents. Dichloromethane is particularly preferred.

The concentration of the starting solutions of thermoplastic polymer, e.g. aromatic polycarbonate, in the organic solvent is from 3% by weight to 25% by weight, preferably from 5% by weight to 15% by weight.

The steam can be admixed into the polymer solution via a T-shaped pipe section or via a nozzle of the ejector type, preferably via a nozzle of the ejector type.

The heat exchanger may be a tubular heat exchanger consisting of a shell tube with an inner tube, in which the inner tube has a length to diameter ratio from 10,000 to 100, preferably from 1000 to 2000, or may be any heat exchanger which has a heat exchange surface equivalent to that of the tubular heat exchanger.

In apparatuses to be used according to the invention for the separation and subsequent further concentration of polymer solutions as far as the pure melt, the risk which was mentioned at the outset of polymer particles or melt droplets being swept away does not exist, since the apparatuses employed are apparatuses of large volume which have built-in components of high gas permeability and sufficiently large vapour cross-sections. On account of the longer dwell time in the apparatuses used according to the invention compared with extruders provided with evaporation heads, the temperature-dependent solvent concentration in the polymer reaches equilibrium. By dispensing with the use of high boiling solvents, the equilibrium temperature is still below the glass transition temperature of the polymer. Partial solids or solidified melts are therefore formed in the separator, which plasticise when further energy is supplied.

In the apparatuses according to the invention, the drive part including the rotating built-in components must therefore be of sufficient mechanical stability to exert control over the shearing forces which occur during plasticisation. The viscosity of pure melts of normal, commercially available polycarbonate of medium viscosity is greater than 10,000 Pa.s at a temperature below 300° C. Due to the mixing of plasticised melt with residual contents of solvents and solidified melt which differ somewhat, which cannot be avoided in continuous operation and which is even desirable here, high local loadings, which are manifested by torque peaks, are prevented. The total energy input, expressed as the specific kneading energy with respect to the discharge throughput of degassed melt, is so high that it was hitherto only achieved in apparatuses such as screw extruders, for example, which cannot be used economically in evaporation processes without the addition of a high boiling solvent, such as monochlorobenzene, for example, on account of the high impact pressure due to the vapours which was mentioned above.

A drying apparatus having rotating built-in components for cleaning off its walls is described in U.S. Pat. No. 5,407,266, for example. This device was modified for use according to the present invention. On account of their mechanical stability being too low for the use according to the invention, the bars which are disposed on the shafts in the longitudinal direction of the apparatus, and which according to claims 1 and 2 of U.S. Pat. No. 5,407,266 are of U-shaped construction, were replaced by straight bars of considerably enlarged cross-section. In addition, the angular position of the bars on the product side, which was 90° for the U-shaped bars, was altered to >90° for the straight bars in order to enhance the scraping action of the bars.

The apparatuses claimed in EP 0 460 466 A1 and in EP 0 528 210 A1 are also suitable in principle for the use according to the invention. The constructions described there also enable the shape of the bars to be altered to provide a satisfactory stability for the use according to the invention.

The separators which are termed intermediate separators in the multi-stage concentration of the polycarbonate solutions are pressure-resistant cylindrical vessels which are fitted with a conical outlet provided with a suitable melt pump.

The Figures described below (FIGS. 1 to 7) constitute examples of equipment arrangements which are suitable for carrying out the process, where:

FIG. 8 is a cross-section through a kneading disc, with kneading bars, of a drying apparatus for use according to the invention.

Figure 1:
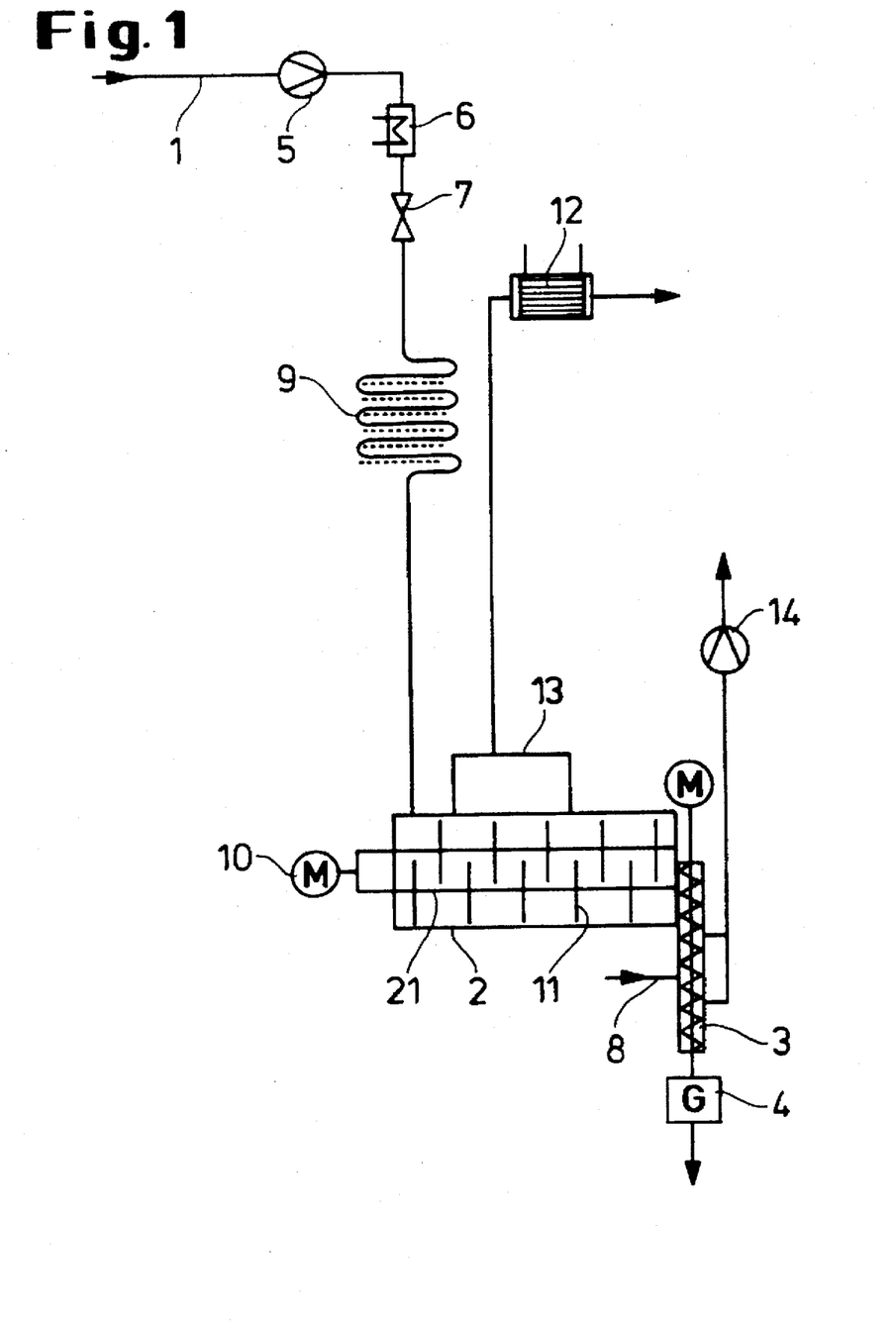
FIG. 1 illustrates a schematic equipment arrangement for carrying out the process according to the invention.

Corresponding to the arrangement shown in FIG. 1, for example, the polymer solution 1 is fed via a pump 5 to a first heat exchanger 6 and then via a pressure regulating valve 7 to a second heat exchanger 9, and is admitted to the drier 2 to be used according to the invention for degassing, and the vapours are fed via the take-off 13 to a separator 12 for isolating the solvent. The melt is discharged via a discharge extruder 3, optionally with the addition of inert gas 8, to the granulating device 4. Additional solvent residues are drawn off from the discharge extruder by means of the pump 14.

Figure 2:
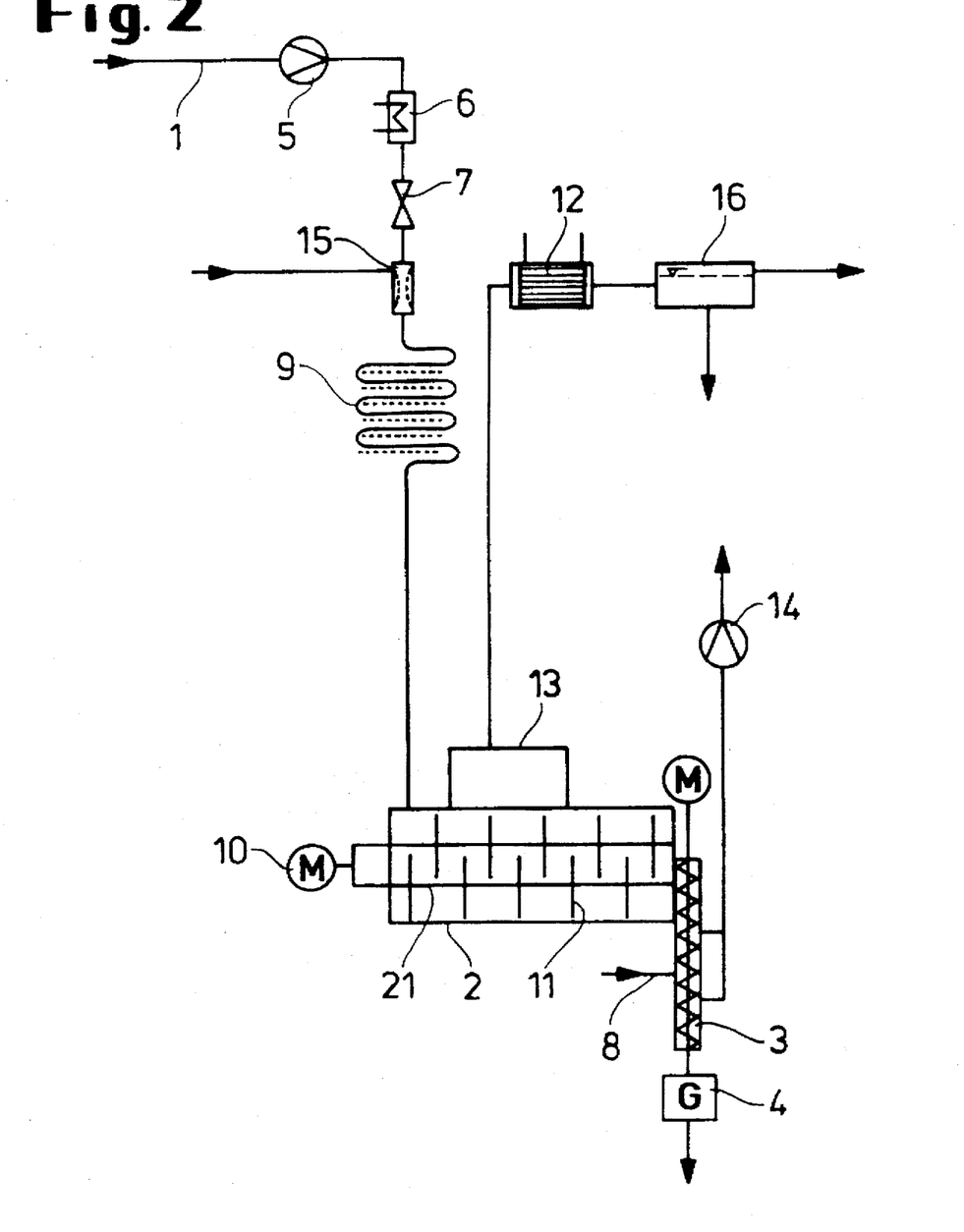
FIG. 2 shows a modification of the arrangement according to FIG. 1, with additional steam stripping.

In the variant of the process according to the invention which is shown in FIG. 2, steam is supplied in a nozzle 15 between the intermediate valve 7 and the second heat exchanger 9. The water is freed, by means of a separator 16, from solvent which occurs together with the water in the vapours from the mixer 2.

Figure 3:
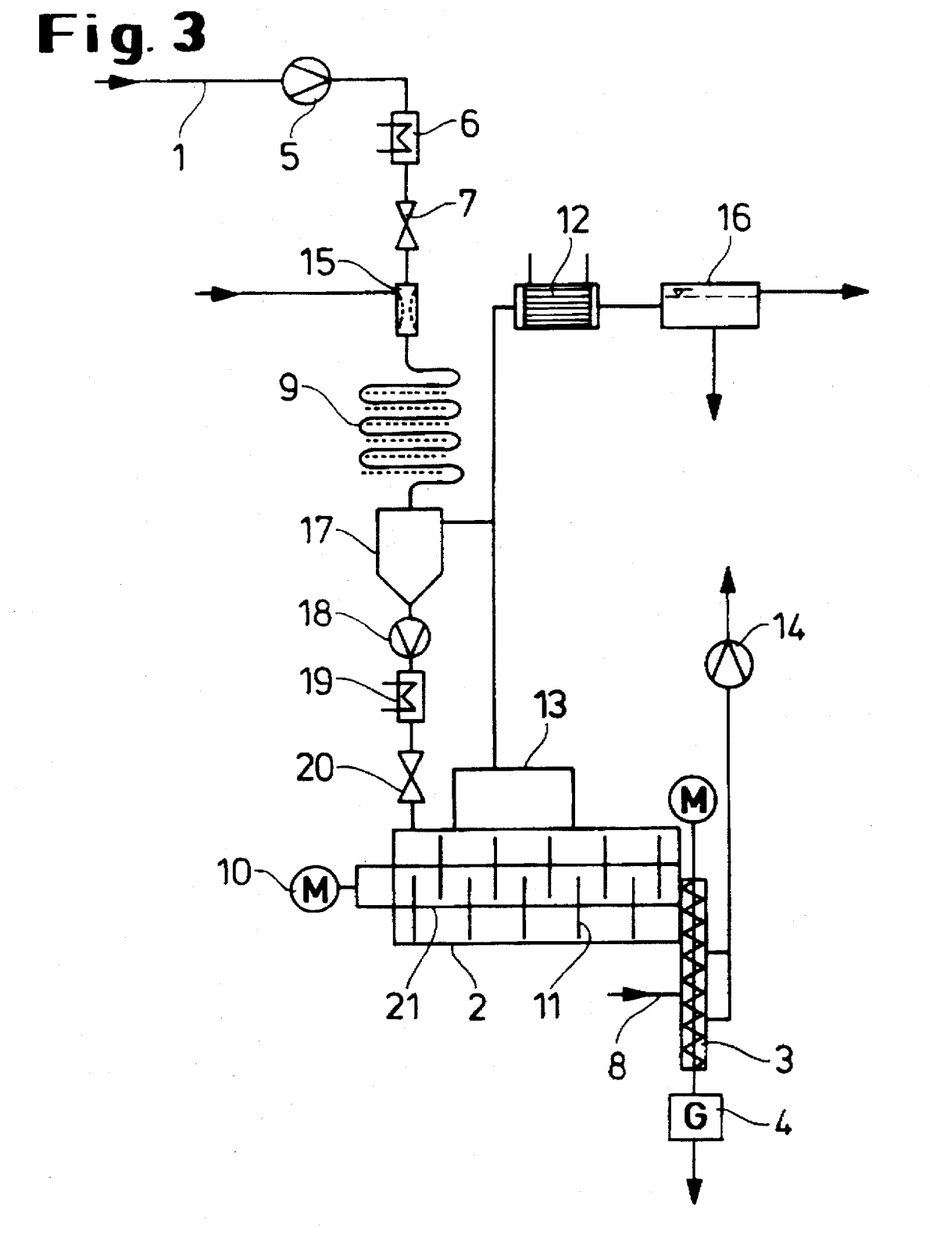
FIG. 3 shows an arrangement comparable with that of FIG. 2, with an additional separator without rotating built-in components.

In the variant of the process which utilises an arrangement corresponding to that of FIG. 3, a further separator 17 without rotating built-in components, a pump 18, a third heat exchanger 19 and a further pressure regulating valve 20 are provided between the second heat exchanger 9 and the drying apparatus 2.

Figure 4:
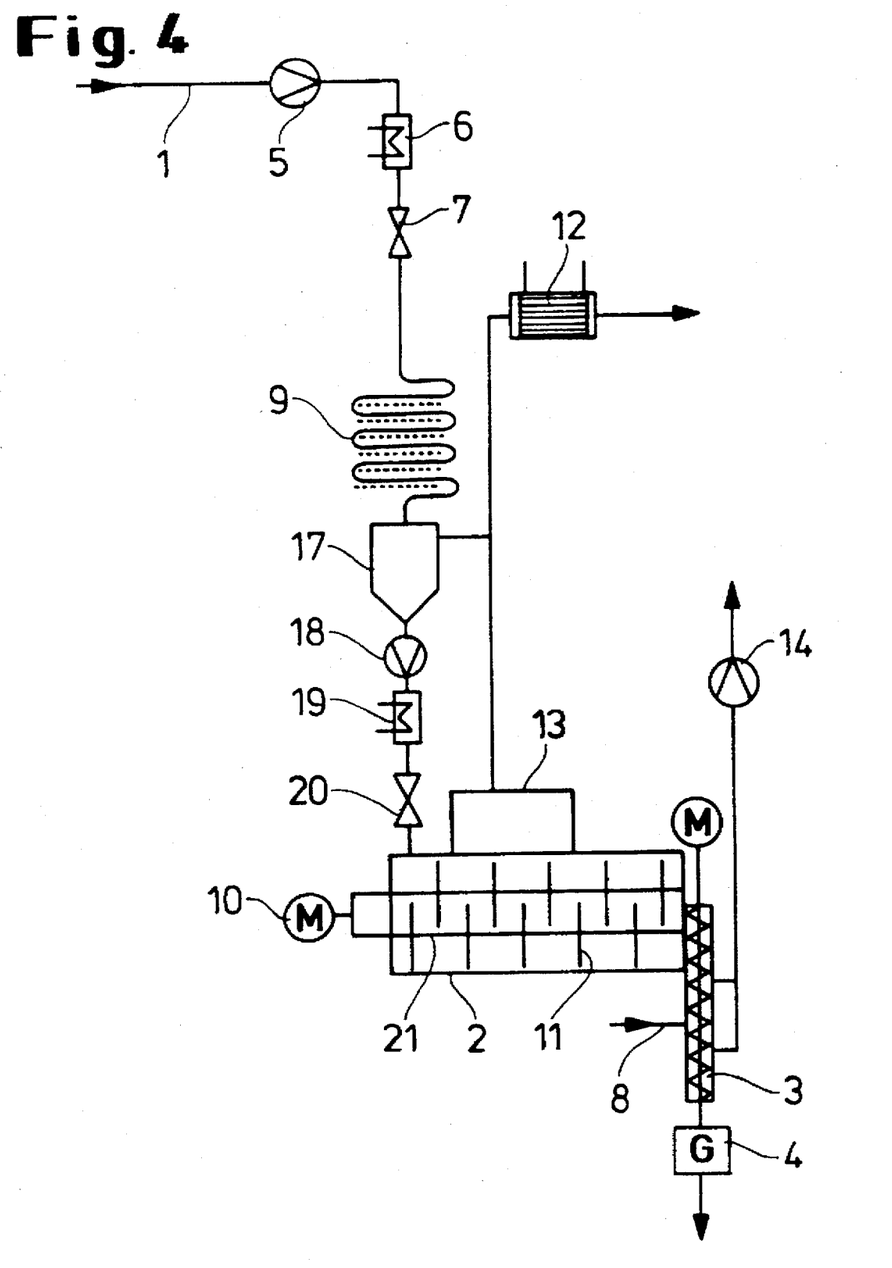
FIG. 4 shows a variant of the arrangement according to FIG. 3, where steam stripping and water separation are omitted.

The steam stripping stage 5 which is outlined in FIG. 3 can also be omitted, whereby the steam nozzle 15 and the water separator 16 can be dispensed with compared with an arrangement corresponding to that of FIG. 3 (see FIG. 4).

Figure 5:
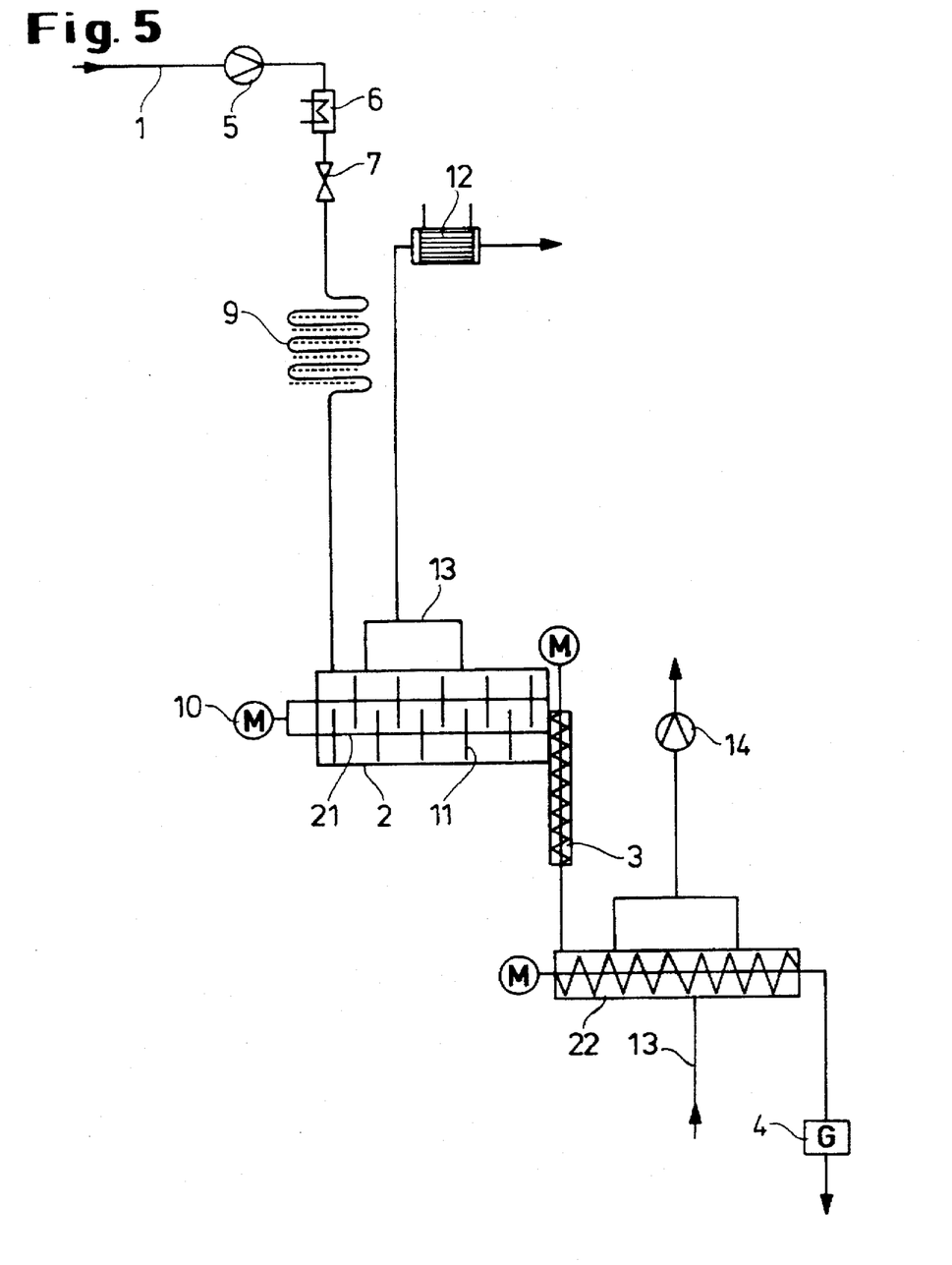
FIG. 5 shows an arrangement for carrying out the process according to the invention in which an extruder having a degassing zone is inserted between the granulation stage and the drying stage in the drying apparatus with rotating built-in components.

Instead of degassing in the discharge extruder 3, degassing can be effected in an additional extruder which has a degassing zone and which is inserted between the discharge extruder 3 and the granulating device 4 (FIG. 5).

Figure 6:
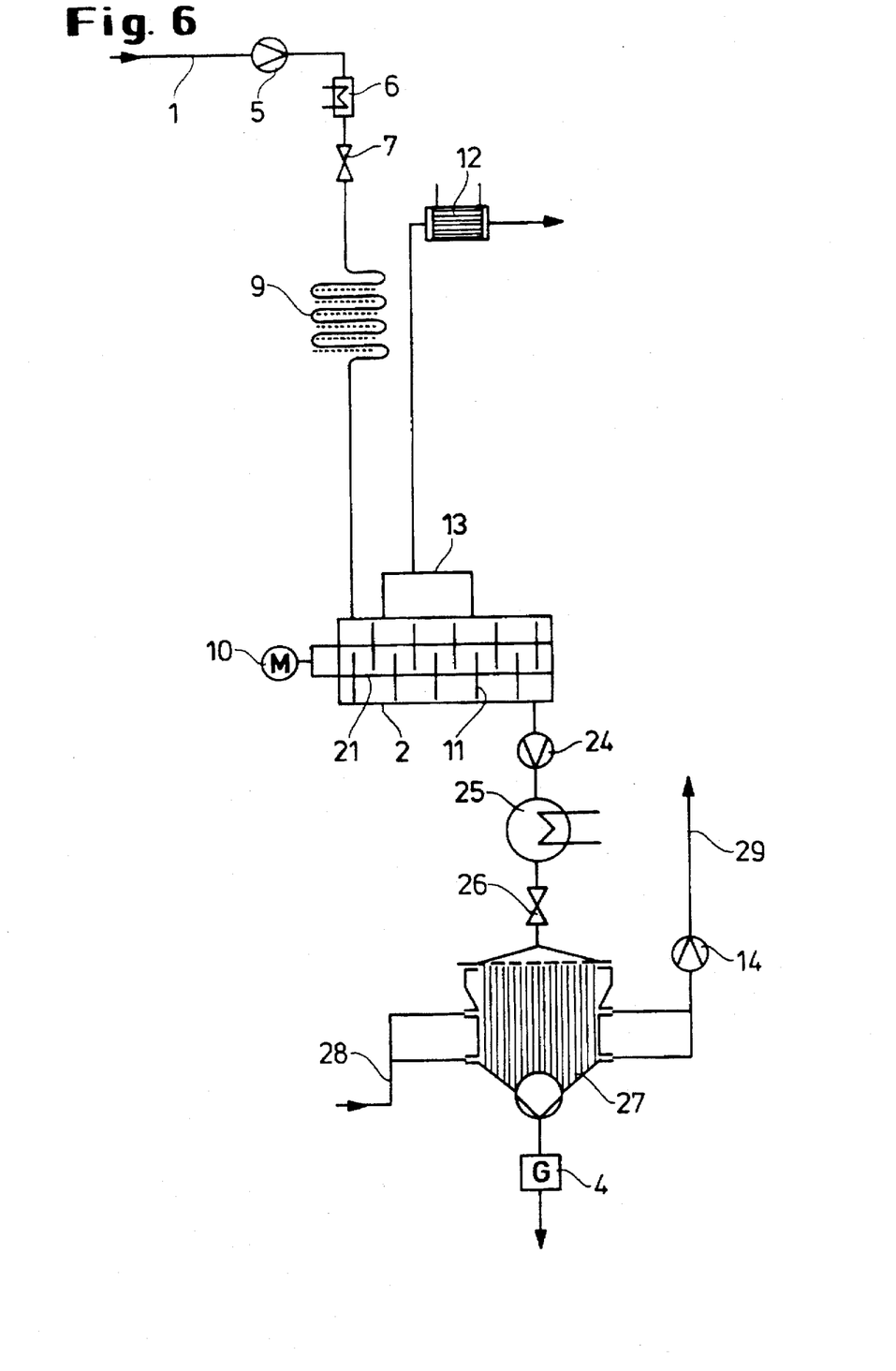
FIG. 6 shows a variant of the equipment in relation to FIG. 1, in which a long-tube evaporator is inserted upstream of the granulation stage, instead of the discharge extruder.

In one variant, the discharge extruder 3 shown in the arrangement in FIG. 1 is optionally replaced by a combination of a melt pump 24, a heat exchanger 25, a pressure regulating valve 26 and a long-tube evaporator 27 having an inert gas feed line 28 and an off-gas discharge line 29 (see FIG. 6).

Figure 7A:
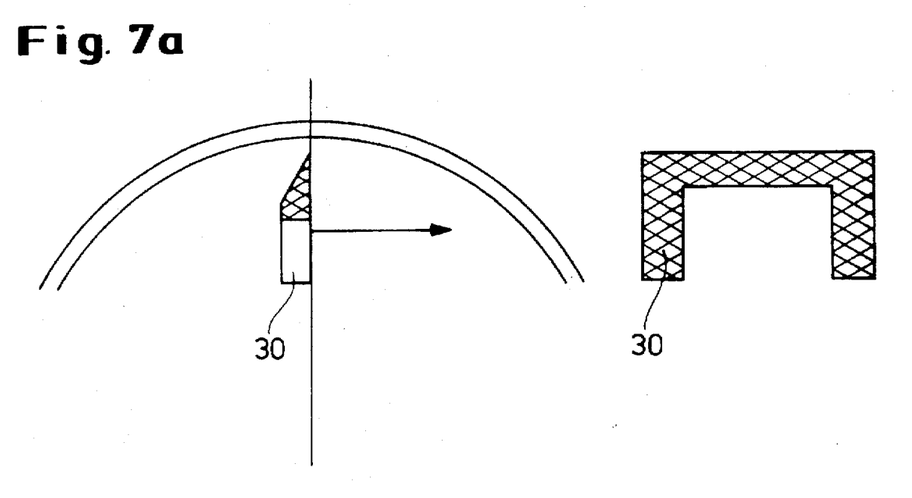
FIGS. 7a and 7b are schematic side and front views of the geometry of the kneader bars of a known drying apparatus (FIG. 7a) and of a drying apparatus modified according to the invention (FIG. 7b)
Figure 7B:
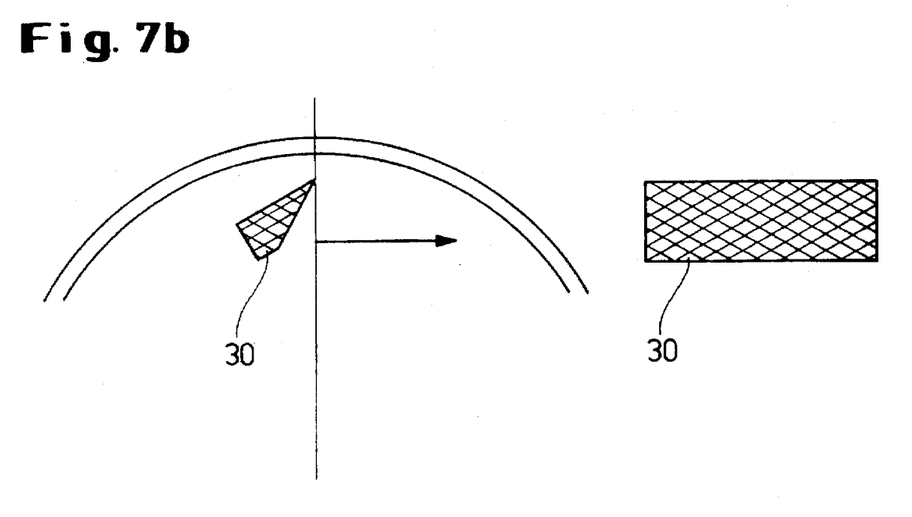
Figure 8A:
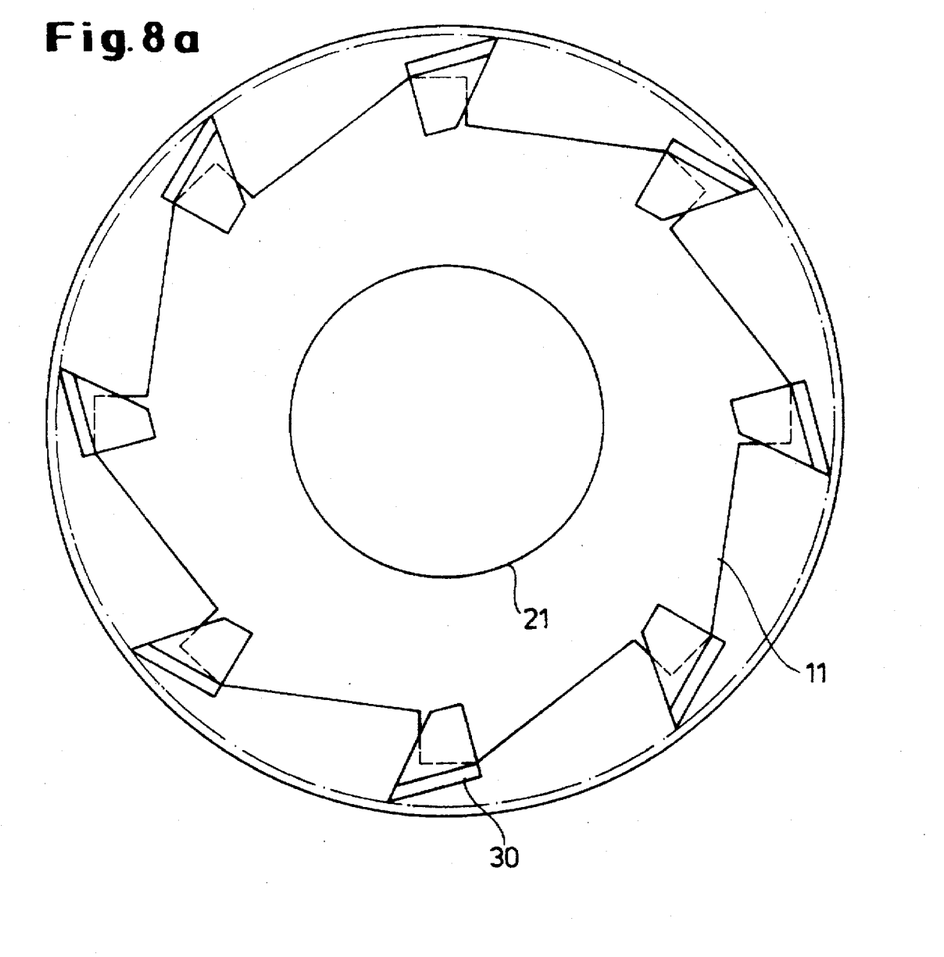
FIG. 8a is a view from the side and FIG. 8b is a view from the top.
Figure 8B:
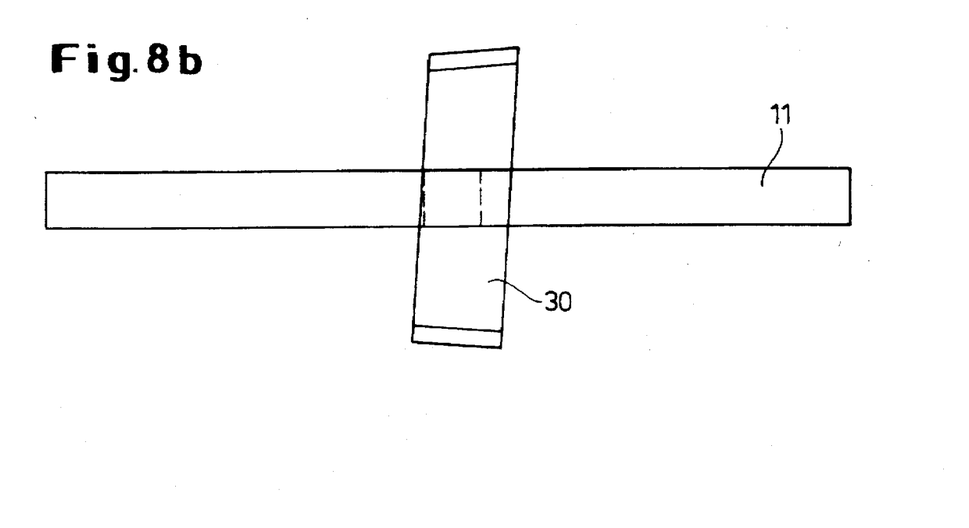

The kneading bars 30 of conventional large volume drying apparatuses, which are disposed on the kneading discs 11, are altered as regards their geometry so that the angle of incidence on the product side is greater than 90° and the bars are considerably enlarged (see FIGS. 7a and 7b).

EXAMPLES

Example 1

60 kg polycarbonate based on bisphenol A and with an average molecular weight of $M_w=29,800$ were dissolved in 340 kg dichloromethane. 70 kg/hr of this 15% polycarbonate solution were mixed with 7.2 kg/hr of steam at a temperature of 195° C. and a pressure of 14.5 bar, in a nozzle formed from a pipe section in the shape of a T-piece. This mixture was passed through a tube with an inside diameter of 6 mm, a wall thickness of 1 mm and a length of 6 m. The tube was surrounded by a shell tube which had an outside diameter of 18 mm and a wall thickness of 1.5 mm. The temperature of the polycarbonate solution in dichloromethane was 23° C.; the temperature of the steam heating medium in the outer tube was 165° C.

The paste-like mixture emerging from the tube was flashed into the vapour take-off opening, which was situated at the discharge end of the tube, of a LIST AP 12 apparatus supplied by LIST, with a volume of 30 liters, the shafts of which were strengthened. The vapours arising were led via the second vapour head of the device to a condenser. The temperature of the cooling medium was 12° C.

The housing and the shafts of the LIST apparatus were heated with a heat transfer oil, the inlet temperature of which was held constant at 250° C. 25 minutes after the start of the test, melt was continuously discharged from the apparatus by means of the discharge screw, which was provided with two vacuum degassing connection pieces and an entraining gas admixture zone, and pressed through a die. The strand of melt emerging from the die was cooled and granulated in a water bath. The sample of granulated material obtained after four hours of operation was analysed. The properties of the granulated material are listed in Table 1. The pressure in the vacuum degassing heads was 0.5 mbar upstream of the entraining gas admixture zone and 1.5 mbar downstream of the entraining gas admixture zone. 50 g $N_2$/hr at a pressure of 40 bar were used as the entraining gas. The filament temperature of the melt strand at the die base was 305° C.

Example 2

39 kg/hr of the polycarbonate solution described in Example 1 were mixed in a nozzle, as described in Example 1, with 0.9 kg/hr of steam at a temperature of 220° C. and a pressure of 30 bar. The temperature of the steam heating medium employed for heating the tubular heat exchanger was increased to 220° C. The mixture emerging from the tubular heat exchanger was treated as described in Example 1. The properties of the granulated material obtained here are given in Table 1.

Example 3

42 kg/hr of the polycarbonate solution described in Example 1 were pumped through the tubular heat exchanger described in Example 1 at an admission pressure of 35 bar, but without the admixture of steam. The mixture formed was flashed into the LIST apparatus mentioned in Example 1 and further treated as described there. The temperature of the steam heating medium employed for heating the tubular heat exchanger was increased to 220° C. The properties of the granulated material obtained here are given in Table 1.

Example 4

73 kg/hr of the polycarbonate solution described in Example 1 were pumped through the heat exchanger tube described in Example 1 at an admission pressure of 35 bar, but without the admixture of steam. The tubular heat exchanger was lengthened to 12 m, maintaining the same cross-section. The temperature of the steam heating medium was increased to 220° C. Separation of the mixture emerging from the tubular heat exchanger was effected analogously to Example 1. The properties of the granulated material obtained here are given in Table 1.

Example 5

68 kg/hr of the polycarbonate solution described in Example 1 were heated, at an admission pressure of 35 bar, in an SMR mixer-heat exchanger supplied by Sulzer, which had a heat exchange surface of 0.106 $m^2$ and which was heated with steam (220° C.). The hot solution emerging from the mixer-heat exchanger was passed through the tubular heat exchanger of length 6 m described in Example 1, but without the admixture of steam, and was flashed into the LIST apparatus as described in Example 1. The temperature of the steam heating medium employed for heating the tubular heat exchanger was 220° C. The properties of the granulated material obtained here are given in Table 1.

Example 6

47 kg/hr of the polycarbonate solution described in Example 1 were treated as described in Example 4. However, a discharge screw without a degassing device and without the admixture of entraining gas was used for the discharge of the melt from the LIST apparatus. The melt discharged from the LIST apparatus by means of the extruder was conveyed in a heated pipeline of inside diameter 12 mm and length 1.3 m to a ZSK 34 unit supplied by Werner & Pfleiderer, which was equipped with two degassing heads and an entraining gas zone. The pressure in the vacuum degassing heads was 0.2 mbar upstream of the entraining gas admixture zone and 1.3 mbar downstream of the entraining gas admixture zone. 50 g $N_2$/hr at a pressure of 40 bar were used as the entraining gas. The filament temperature of the melt strand at the die base was 320° C. The properties of the granulated material obtained here are given in Table 1.

Example 7

41 kg/hr of the polycarbonate solution described in Example 1 were treated as described in Example 6. However, a melt pump was used for the discharge of the melt from the LIST apparatus. The melt discharged from the LIST apparatus by means of the melt pump was conveyed in a heated pipeline of inside diameter 12 mm and length 0.3 m to a long-tube evaporator and was degassed there. The pressure in the long-tube evaporator was 0.8 mbar. The melt from the long-tube evaporator was pressed through a die of diameter 3.5 mm by means of a melt pump. The melt strand formed was cooled and granulated in a water bath. The filament temperature at the die was 290° C. The properties of the granulated material obtained here are given in Table 1.

Example 8

81 kg/hr of the polycarbonate solution described in Example 1 were heated, as described in Example 5, at an admission pressure of 40 bar, in an SMR mixer-heat exchanger supplied by Sulzer, which had a heat exchange surface of 0.106 m$^2$ and which was heated with steam (165° C.). The hot solution emerging from the mixer-heat exchanger was passed through the tubular heat exchanger of length 6 m described in Example 1, but without the admixture of steam, and was flashed into a cylindrical separator at a pressure of 5 bar which was provided with a conical discharge part and which had a volume of 60 liters. The vapours were taken off via a top opening with a clear width of 10 mm and flashed into a condenser. The temperature of the steam heating medium employed for heating the tubular heat exchanger was 165° C. The mnaterial which was separated in the vessel described above was pumped by means of an entrapment pump through an SMR mixer-heat exchanger supplied by Sulzer, which had a heat exchange surface of 0.106 m$^2$ and which was heated with steam (165° C.), and was flashed into the LIST apparatus described in Example 1 via an expansion valve which was set to 5 bar. The mixture was concentrated further as stated in Example 1. The properties of the granulated material obtained here are given in Table 1.

Comparative Example 1

39 kg/hr of the polycarbonate solution described in Example 1 were preconcentrated as stated in Example 8. The material emerging from the SMR heat exchanger was conveyed directly into a twin-screw kneader fitted with meshing screws. The twin-screw kneader was provided with two degassing heads; the first degassing head was maintained at a pressure of 3 bar, the second was maintained at a pressure of 10 mbar. The diameter D of the screws was 48 mm, and the total length was 1440 mm. The extruder housing was heated over its entire length to a temperature of 270° C., and the temperature of the die was held at 220° C. The extruder speed was 50 rpm. The properties of the extruded polycarbonate are listed in Table 1.

Comparative Example 2

72 kg of monochlorobenzene were admixed with 85 kg of the 15% solution of polycarbonate in dichloromethane prepared as in Example 1. This solution was concentrated by means of a thin film evaporator until a solution of 50% polycarbonate was obtained. Superheated steam at 150° C. was used as the heating medium.

30 kg/hr of the solution described above was conveyed via a line heated to 150° C. into a twin-screw kneader fitted with meshing screws. The twin-screw kneader was provided with two degassing heads; the first degassing head was operated at normal pressure, the second was operated at a pressure of 1 mbar. The diameter D of the screws was 48 mm, and the total length was 1440 mm. The extruder housing was heated over its entire length to a temperature of 270° C., and the temperature of the die was held at 220° C. The extruder speed was 50 rpm. The properties of the extruded polycarbonate are listed in Table 1.

TABLE 1

| | Residual content of DCM after degassing (ppm) | Organically y bound chlorine (ppm) | Yellowness s Index YI | Viscosity decrease (Δ rel. viscosity) |
|---|---|---|---|---|
| Example 1 | <0.2 | <0.1 | 1.6 | <0.001 |
| Example 2 | <0.2 | <0.1 | 1.9 | <0.001 |
| Example 3 | <0.2 | <0.1 | 2.2 | <0.001 |
| Example 4 | <0.2 | <0.1 | 2.3 | <0.001 |
| Example 5 | <0.2 | <0.1 | 2.9 | 0.002 |
| Example 6 | <0.2 | <0,1 | 2.7 | 0.005 |
| Example 7 | <0.2 | <0.1 | 2.4 | <0.001 |
| Example 8 | <0.2 | <0.1 | 2.9 | <0.001 |
| Comparative example 1 | 8 | 14 | 6.5 | 0.005 |
| Comparative example 2 | <0.2 | 120* | 3.5 | 0.006 |

DCM = dichloromethane
*from the content of residual solvent (monochlorobenzene)

We claim:

1. A process for producing granulated polymer materials from polymer solutions of thermoplastic polymers by preconcentration of the polymer solution by means of heat exchange or stripping the solvent with steam in a holding tube or a heat exchanger to form concentrated polymer solution or paste, further concentration and drying in a drying apparatus, extrusion and granulation of the dried polymer, wherein the polymer solution, with a polymer concentration of 3 to 30% by weight in an organic solvent, is heated to 50° to 300° C. under a pressure of 1 to 15 bar in one or more heat exchangers, the total heat exchange surface of which is 0.02 m$^2$/100 kg/hr solvent to 2 m$^2$/100 kg/hr solvent, or is heated by mixing with superheated steam at a solvent to steam ratio of ≧10:1 in a heated or unheated holding tube having a length to diameter ratio of 100 to 10,000, or is heated by mixing with steam at a temperature of 100° to 300° C. and at a pressure of 1 to 100 bar in a heat exchanger, the heat exchange surface of which is 0.02 m$^2$/100 kg/hr solvent to 2 m$^2$/100 kg/hr solvent, and the mixture heated in this manner is separated by flashing into a separator with separation of the vapours to form a concentrated polymer solution or paste with a concentration of 25 to 80% by weight of the concentrated paste or solution with respect to the polymer, that the concentrated polymer solution or paste is heated and is further concentrated or degassed in a drying apparatus, which is provided with rotating built-in components for mechanically cleaning off the apparatus walls and for mass transfer, by heating the housing jacket or by heating the rotating built-in components or by heating the housing jacket and the rotating built-in components, and by the shearing caused by the built-in components moving in the separated material, wherein the temperature of the apparatus wall or of the built-in components is from 150° to 400° C., concentration and degassing are effected at an internal pressure of 1 mbar to 5 bar, wherein in addition the total energy input expressed as the specific kneading energy with respect to the discharge throughput is 0.01 to 1 kWh per kg of dry polymer melt, and the dwell time in the drier is from 5 to 90 minutes.

2. A process according to claim 1, wherein the length to diameter ratio of the holding tube is 1000 to 2000.

3. A process according to claim 1, wherein pre-concentration is effected by mixing with steam at a temperature of 200° to 250° C. and at a pressure of 16 to 30 bar.

4. A process according to claim 1, wherein pre-concentration is effected to a polymer content of 35 to 60% by weight.

5. A process according to claim 1, wherein the temperature to which the apparatus wall or the built-in components of the drying apparatus are heated is from 200° to 300° C.

6. A process according to claim 1, wherein drying is effected in the drying apparatus at normal pressure with the addition of inert gas or steam.

7. A process according to claim 1, wherein the total energy input of the rotating built-in components of the drying apparatus is from 0.05 to 0.5 kWh per kg of dry polymer melt.

8. A process according to claim 1, wherein the dwell time in the drying apparatus is from 15 to 20 minutes.

9. A process according to claim 1, wherein polycarbonate, polyester carbonate, polyalkylene terephthalate, ethylene propylene diene terpolymer rubbers, polystyrene, and polystyrene copolymers, are used as the thermoplastic polymer.

10. A process according to claim 9, wherein the thermoplastic polymer is an aromatic polycarbonate or an acrylonitrile-butadiene-styrene graft copolymer (ABS).

11. A process according to claim 10, wherein an aromatic polycarbonate is used which has a molecular weight characterised by a solution viscosity $\eta_{rel.}$ of 1.15 to 1.40.

12. A process according to claim 1, wherein the polymer solution has a polymer concentration of 15 to 25% by weight.

13. A process according to claim 5, wherein the drying apparatus is heated 240° to 250° C.

14. A process according to claim 7, wherein the total energy input of the rotating built-in components of the drying apparatus is from 0.1 to 0.3 kWh per kg of dry polymer melt.

15. A process according to claim 11 wherein the solution viscosity $\eta_{rel.}$ is 1.20 to 1.35.

* * * * *